(12) United States Patent
Paljug et al.

(10) Patent No.: US 7,254,373 B2
(45) Date of Patent: Aug. 7, 2007

(54) ANTENNA DIVERSITY BASED ON PACKET ERRORS

(75) Inventors: Michael J. Paljug, Palm Bay, FL (US); Fanqiang Yin, Palm Bay, FL (US)

(73) Assignee: Conexant, Inc., Red Bank, NJ (US)

( * ) Notice: Subject to any disclaimer, the term of this patent is extended or adjusted under 35 U.S.C. 154(b) by 751 days.

(21) Appl. No.: 10/672,438

(22) Filed: Sep. 26, 2003

(65) Prior Publication Data

US 2004/0147289 A1    Jul. 29, 2004

Related U.S. Application Data

(60) Provisional application No. 60/443,076, filed on Jan. 28, 2003, provisional application No. 60/443,077, filed on Jan. 28, 2003.

(51) Int. Cl.
*H04B 1/38* (2006.01)
*H04B 17/00* (2006.01)

(52) U.S. Cl. ............... 455/90.3; 455/67.13; 455/115.3; 343/701; 370/280

(58) Field of Classification Search ............ 455/67.11, 455/67.13, 101, 115.3, 575.6, 347, 351, 562.1, 455/556, 272, 90.3; 343/701, 702; 370/280
See application file for complete search history.

(56) References Cited

U.S. PATENT DOCUMENTS

| | | | |
|---|---|---|---|
| 6,088,337 A * | 7/2000 | Eastmond et al. | 370/280 |
| 6,694,151 B2 * | 2/2004 | Carlson | 455/556.1 |
| 6,741,293 B1 * | 5/2004 | Obuchi | 348/554 |
| 6,839,325 B2 * | 1/2005 | Schmidl et al. | 370/242 |
| 7,146,134 B2 * | 12/2006 | Moon et al. | 455/67.11 |

* cited by examiner

*Primary Examiner*—Tony T. Nguyen
(74) *Attorney, Agent, or Firm*—Thomas, Kayden, Horstemeyer & Risley, LLP

(57) ABSTRACT

A wireless transceiver including multiple antennas, an antenna switch, and a media access controller that controls the antenna switch for determining when to switch to another antenna based on packet error rate (PER). Instead of switching the antenna on a packet-by-packet basis, antenna selection is made after one or more packets errors have been detected. The CRC is used to identify receive packet errors. A timer is used to determine each transmit packet error when an acknowledge packet is not received in time. A method of selecting from among multiple antennas including counting packet errors, comparing a packet error count with a threshold value to determine a threshold condition, switching to a different antenna if the threshold condition is met, and resetting the packet error count when the threshold condition is met.

22 Claims, 9 Drawing Sheets

ANTENNA DIVERSITY BASED ON PACKET ERRORS

CROSS-REFERENCE TO RELATED APPLICATIONS

This application claims the benefit of U.S. Provisional Applications Nos. 60/443,076 and 60/443,077 both filed on Jan. 28, 2003, which are herein incorporated by reference in their entireties for all intents and purposes.

BACKGROUND OF THE INVENTION

1. Field of the Invention

The present invention relates to wireless communications, and more particularly to an antenna diversity scheme for selecting one of multiple antennas of a transceiver based on packet errors.

2. Description of the Related Art

Antenna diversity methods are used by wireless transceivers with multiple antennas to switch the antenna to improve performance in a multipath environment. Heretofore, hardware diversity schemes have been devised to make the antenna decision on a packet-by-packet basis during packet reception. For example, the hardware measures the signal at the front end of the packet being received and picks the antenna with the best signal strength for receiving the balance of the packet. This antenna decision is typically made at the front end of the packet preamble, such as, for example, within the first 20 microseconds (us) of a 128 us preamble. The same antenna selected to receive packets is usually used for transmission where it is left to the receiver to successfully receive the packet.

The existing hardware diversity schemes have been based on various metrics, such as signal strength or signal integrity (e.g., RSSI, delay spread, etc.) or the like and tended to be complicated to implement and cumbersome to use.

SUMMARY OF THE INVENTION

A wireless transceiver according to an embodiment of the present invention includes a plurality of antennas, an antenna switch coupled to the antennas, and a media access controller coupled to control the antenna switch that determines when to switch to another antenna based on packet error rate. Instead of switching the antenna on a packet-by-packet basis, antenna selection is made after one or more packets errors have been detected.

In one embodiment, the media access controller switches to another antenna if a threshold number of unicast packets are received with a cyclical redundancy code (CRC) error. In another embodiment, the media access controller switches to another antenna if a threshold number of transmitted unicast packets are not properly acknowledged (e.g., in which an acknowledge packet is not received within a predetermined period of time). In yet other embodiments, the media access controller uses a selected antenna for both receive and transmit operations, or alternatively selects a transmit antenna for transmitting packets and a receive antenna for receiving packets. Separate thresholds may be employed for transmit and receive modes of operation.

An antenna diversity system for a wireless transceiver having a plurality of antennas according to an embodiment of the present invention includes an antenna switch, at least one counter, at least one packet error detector, and antenna select logic. The antenna switch selects from among the plurality of antennas. The counter(s) store at least one packet error count. The packet error detector(s) detect a packet communication error. The antenna select logic increments the packet error count when a packet communication error is detected, compares the packet error count with a threshold value to determine whether a threshold condition is met, and switches the antenna when the threshold condition is met.

In various embodiments, a global packet error count and a packet error threshold are used, or separate transmit and receive counters and thresholds are used. Corresponding packet error counts may be reset if a unicast packet is successfully transmitted or successfully received. The packet error detector may include a timer that determines whether an acknowledge packet is received within a predetermined amount of time. Also, the packet error detector may include CRC check logic which determines whether a packet is received with an error.

A method of selecting from among a plurality of antennas of a transceiver according to an embodiment of the present invention includes counting packet errors, comparing a packet error count with a threshold value to determine a threshold condition, switching to a different antenna if the threshold condition is met, and resetting the packet error count when the threshold condition is met.

Counting packet errors may include determining whether a received unicast packet has an error and incrementing the packet error count if the received unicast packet has an error. The method may include resetting the packet error count if a unicast packet is received without an error. The method may include determining whether the received unicast packet has a CRC error. Counting packet errors may include determining whether a transmitted unicast packet is acknowledged within a predetermined amount of time and incrementing the packet error count if the transmitted unicast packet is not acknowledged in time. The method may include resetting the packet error count if a transmitted unicast packet is acknowledged within the predetermined amount of time.

The method may include using a first selected antenna for transmitting packets and using a second selected antenna for receiving packets. In this case, counting packet errors may include incrementing a received packet error count if a unicast packet is received with an error and incrementing a retry error count if a transmitted unicast packet is not acknowledged within a predetermined amount of time. Also, the comparing may include comparing the received packet error count with a first threshold value to determine a first threshold condition and comparing the retry error count with a second threshold value to determine a second threshold condition. Furthermore, the switching may include switching the first selected antenna to different antenna for receiving packets if the first threshold condition is met, and switching the second selected antenna to different antenna for transmitting packets if the second threshold condition is met.

The method may include resetting the received packet error count if a unicast packet is received without an error, and resetting the retry error count if a transmitted unicast packet is acknowledged within the predetermined amount of time. The method may further include selecting a corresponding antenna for each of one or more remote stations for transmitting unicast packets, counting unicast transmit retry errors for each of the one or more remote stations, switching the selected antenna for transmitting unicast packets to a remote station if a corresponding retry error count meets a threshold condition, and resetting the retry error count of a corresponding remote station if the threshold condition is met for that remote station.

BRIEF DESCRIPTION OF THE DRAWINGS

The benefits, features, and advantages of the present invention will become better understood with regard to the following description, and accompanying drawings where.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

The inventors of the present application have recognized the need for switching antennas of a station with multiple antennas to improve performance of the station, particularly in a multipath environment. They have therefore developed an antenna diversity system and method for selecting an antenna based on a number of packet errors, as will be further described below with respect to FIGS. 1-9.

Figure 1:
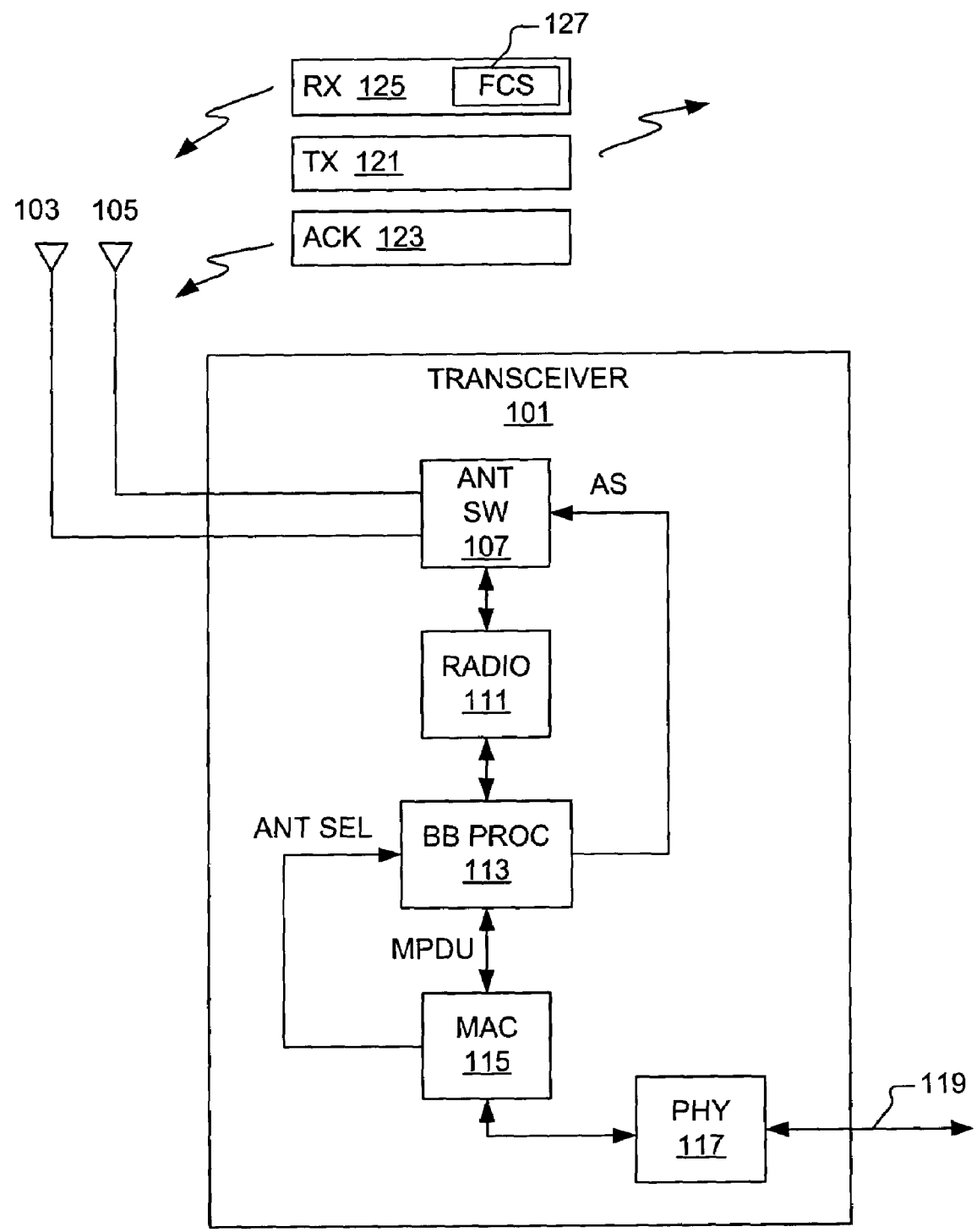
FIG. 1 is a block diagram of a wireless radio frequency (RF) transceiver implemented according to an exemplary embodiment of the present invention.

FIG. 1 is a block diagram of a wireless radio frequency (RF) transceiver 101 implemented according to an exemplary embodiment of the present invention. The transceiver 101 may be used to communicate with one or more similar wireless devices across a wireless medium, such as within a wireless local area network (WLAN) or the like. The transceiver 101 may be implemented according to any of the Institute of Electrical and Electronics Engineers, Inc. (IEEE) family of 802.11 standards, including 802.11a, 802.11b, 802.11 g, etc. The IEEE 802.11a standard, for example, operates at approximately 5 Gigahertz (GHz) at raw data transfer rates up to 54 megabits per second (Mbps). The IEEE 802.11b standard operates at approximately 2.4 Gigahertz (GHz) at raw data transfer rates up to 11 megabits per second (Mbps). The IEEE 802.g standard operates in the same RF band as 802.11b and is backwards compatible with 802.11b, but may also operate up to 54 Mbps. It is appreciated, however, that the teachings of the present invention may be applied in the same or similar manner to other types of wireless communications including wireless devices using any particular RF band.

Although the present invention is illustrated for use by a WLAN device in exemplary embodiments, it is understood that the present invention is not limited to WLAN applications and applies to any wireless communication device employing packet or frame type communications. The transceiver 101 may be used by any type of station to incorporate wireless communication capabilities, such as a wireless access point (AP), any type of computer or computer system (e.g., personal computers, laptop computers, desktop computers, etc.,), printing devices including any type of printer technology, personal digital assistants (PDAs) or the like, scanners, fax machines, etc.

The transceiver 101 may be configured as a plug-in peripheral or expansion card that plugs into an appropriate slot or interface of a computer system, such as a Personal Computer Memory Card International Association (PCM-CIA) card or PC Card or may be implemented according to any type of expansion or peripheral standard, such as according to the peripheral component interconnect (PCI), the Industry Standard Architecture (ISA), the Extended-ISA (EISA) standard, etc. Mini PCI cards with antennas embedded in displays are also contemplated. Self-contained or standalone packaging with appropriate communication interface(s) is also contemplated, which is particularly advantageous for APs. The transceiver 101 may be implemented as a separate unit with serial or parallel connections, such as a Universal Serial Bus (USB) connection or an Ethernet interface (twisted-pair, coaxial cable, etc.), or any other suitable interface to the device. Other types of wireless devices are contemplated, such as any type of wireless telephony device including cellular phones.

The transceiver 101 communicates via the wireless medium using multiple antennas 103, 105 coupled to an antenna switch 107, which selects an antenna to transmit (TX) or receive (RX). An antenna select signal AS controls the state of the antenna switch 107. Although only two antennas 103 and 105 are shown, it is understood that any number of antennas may be included. The antenna switch 107 is coupled to a radio chip or device (radio) 111, which generally operates to convert between RF signals and baseband signals in the analog domain. The radio 111 may be implemented using an intermediate frequency (IF) stage or as a direct conversion or zero-IF (ZIF) configuration. The radio 111 is coupled to a baseband processor (BB PROC) 113, which generally operates to encode and/or modulate MAC packets or MAC protocol data units (MPDUs) into packets for transmission and to decode and/or demodulate received packets into MPDUs. The baseband processor 113 asserts the AS signal to control the antenna switch 107 for selecting one of the antennas 103, 105. The baseband processor 113 is coupled to a medium access control (MAC) device 115, which communicates with an associated communication device or system via an appropriate physical (PHY) device 117 and corresponding interface 119. The MAC device 115 asserts an antenna select signal ANT SEL to the baseband processor 113 for selecting the antenna as further described below.

Digital data sent from or received by the transceiver 101 is processed through the MAC device 115. For transmission mode of operation, the MAC device 115 provides packet information in the form of a MAC packet or MPDU to the baseband processor 113. Each MPDU is processed by the baseband processor 113 and converted to an RF signal by the radio 111 and transmitted in the wireless medium via a selected antenna. As shown, for example, a packet 121 is depicted being transmitted in the wireless medium. The ensure that the packet 121 was properly received, the target remote station responds with an acknowledge (ACK) packet 123 received by the transceiver 101. If the ACK packet 123 is not detected or otherwise not received, then the transceiver 101 determines that its transmitted packet 121 was not properly received by the remote station. For receive mode of operation, the reverse process is performed in which an RF signal received by the radio 111 is converted to baseband and into an MPDU, which is forwarded to the MAC device 115. As shown, for example, a packet 125 is depicted being received by the transceiver 101 from the wireless medium, which is converted to an MPDU and provided to the MAC device 115. The received packet 127 includes a frame check sequence (FCS) field 127 incorporating a cyclical redundancy code (CRC), which is used by the MAC device 115 to determine whether the packet was properly received.

In the embodiment shown, the MAC device 115 asserts the ANT SEL signal to the baseband processor 113 for selecting one of the antennas 103 or 105 for communications. In one embodiment, for example, the MAC device 115 sets one or more bits of a register (not shown) within the baseband processor 113, which then asserts the AS signal to control the antenna switch 107. The selection is based on the number of packet errors, which is often referred to as the packet error rate (PER). Many variations and corresponding embodiments are contemplated. Transmit and receive antenna diversity may be determined in infrastructure mode in which the transceiver 101 is an AP or communicates solely with an AP in a WLAN. Alternatively, the ad hoc mode is contemplated in which the transceiver 101 communicates with multiple stations located in the WLAN. PER may be determined using only directed data and management type frames which have a unicast address as the destination address, in which broadcasting and multicasting frames transmitted at basic data rates are ignored. Receive diversity examines the packets received by the transceiver 101 in which the transmitted CRC is compared with a calculated CRC to determine a CRC error. Transmit diversity uses an indirect method in which a packet error occurs if an ACK packet is not received in response to a transmitted packet within the allotted time frame.

The number of packet errors is counted and compared with a threshold to determine whether a threshold condition is met. If so, the antenna is switched. In one embodiment, the selected antenna is used for both transmit and receive operations. In another embodiment, transmit and receive diversity is separated in which the selected transmit antenna may be different than the selected receive antenna. The PER may be based on a consecutive number of receive errors or a consecutive number of transmit errors or a combination of both. In one embodiment, separate transmit or receive error thresholds are used. Alternatively, a global packet error threshold is used. For the ad hoc modes of operation, embodiments are described herein in which statistics are stored for each of multiple remote stations, such as based on station address (e.g., MAC address). In this case, a different antenna may be selected for each of multiple destination addresses. Also, receive statistics may be tallied and stored for selecting an antenna for transmitting packets to a particular station.

Figure 2:
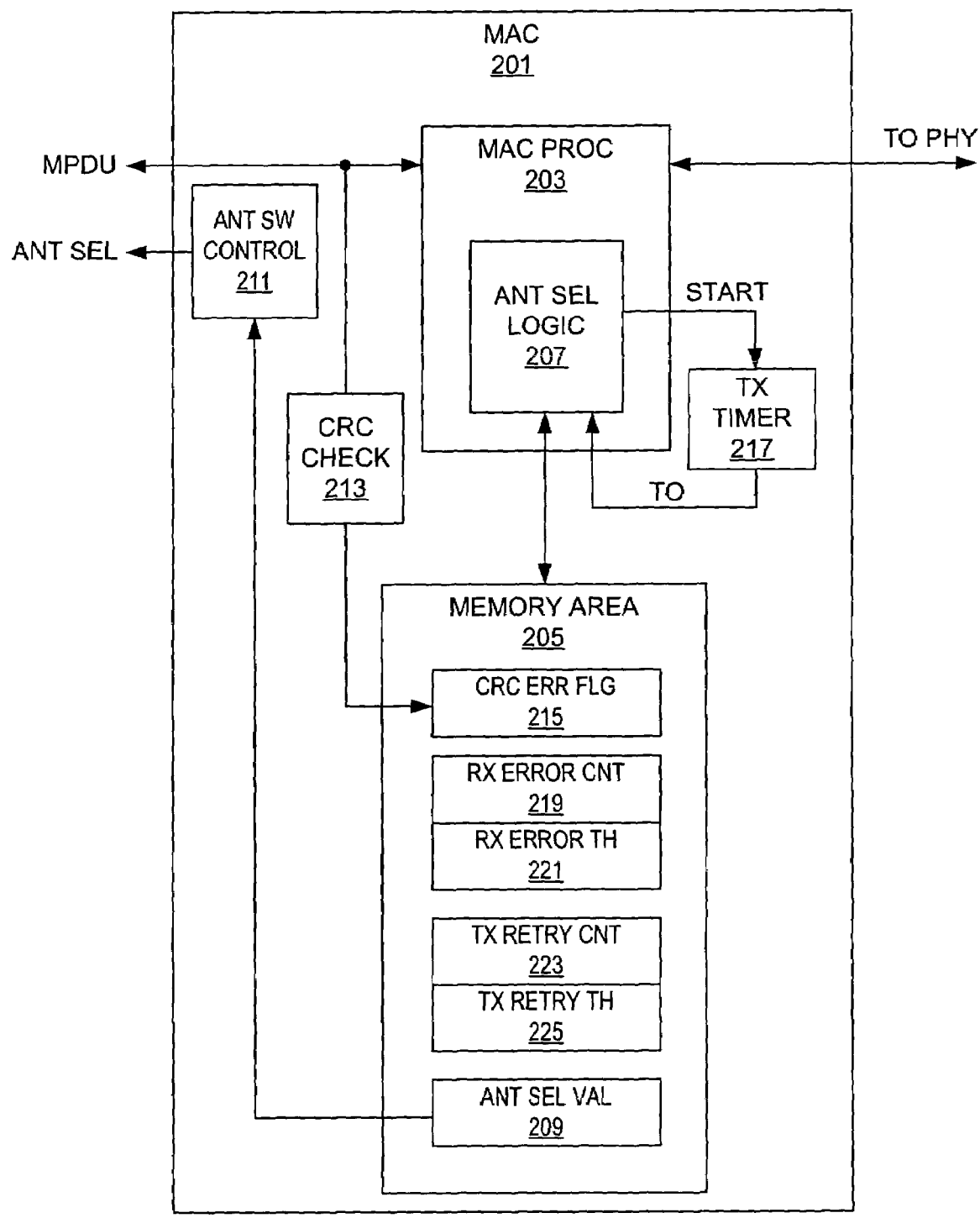
FIG. 2 is a more detailed block diagram of an embodiment of a MAC device implemented according to an exemplary embodiment of the present invention which may be used as the MAC device of FIG. 1.

FIG. 2 is a more detailed block diagram of an embodiment of a MAC device 201 implemented according to an exemplary embodiment of the present invention which may be used as the MAC device 115. The MAC device 201 includes a MAC processor 203 which performs the primary functions of the MAC device 201, and which communicates with the baseband processor 113 and with the PHY device 117 as known to those skilled in the art. The MAC processor 203 may be implemented with any combination of hardware, software, firmware, circuitry, logic, etc. The MAC device 201 includes a memory area 205 for storing routines, data, parameters, etc., and which comprises any combination of memory devices including RAM, ROM, registers, etc. The MAC processor 203 includes antenna select logic 207 which performs the function of selecting the appropriate one of the antennas 103, 105 as further described below.

In the embodiment shown, the antenna select logic 207 is communicatively coupled to the memory area 205 and programs an antenna select value (ANT SEL VAL) 209 therein. The ANT SEL VAL 209 may have any appropriate form, such as one or more bits of a register. An antenna switch controller 211 continuously or otherwise periodically reads the ANT SEL VAL 209 and asserts the ANT SEL signal indicative thereof. The MAC device 201 includes CRC check logic 213 which calculates and checks the CRC of received MPDUs as known to those skilled in the art. If a CRC error occurs, the CRC check logic 213 sets a CRC error flag 215 in the memory area 205. The antenna select logic 207 reads the CRC error flag 215 for each newly received MPDU to determine if a CRC error has occurred. The MAC device 201 includes a TX timer 217 which is controlled by the antenna select logic 207 for determining transmit errors. In the embodiment shown, the antenna select logic 207 initiates the TX timer 217 via a start signal START when the MAC processor 203 sends an MPDU for transmission, and then monitors a timeout signal TO from the TX timer 217. The amount of time for the timeout condition corresponds to how long a station should wait for an ACK frame as specified in the applicable IEEE 802.11 standard. If the TO signal is asserted before an ACK packet is received in response to the transmitted packet, then a transmission error has occurred. The CRC check logic 213 and the TX timer 217 are used as packet error detectors to identify packet communication errors.

The memory area 205 includes a receive error count (RX ERROR CNT) 219 and a receive error threshold (RX ERROR TH) 221. The antenna select logic 207 controls the RX ERROR CNT 219 to track the number of receive packet errors. As described herein, the count (CNT) values stored in the memory area 205 are used by antenna select logic as counters to count corresponding packet errors, where it is understood that other counting or timing implementations, such as physical counters or the like, may be used instead. The antenna select logic 207 compares the RX ERROR CNT 219 with the RX ERROR TH 221 to determine whether a receive threshold condition has occurred as further described below. In a similar manner, the memory area 205 further includes TX retry count (TX RETRY CNT) 223 and a TX retry threshold (TX RETRY TH) 225. The antenna select logic 207 controls the TX RETRY CNT 223 to track the number of transmit packet errors. The antenna select logic 207 compares the TX RETRY CNT 223 with the TX RETRY TH 225 to determine whether a transmit threshold condition has occurred as further described below.

Figure 3:
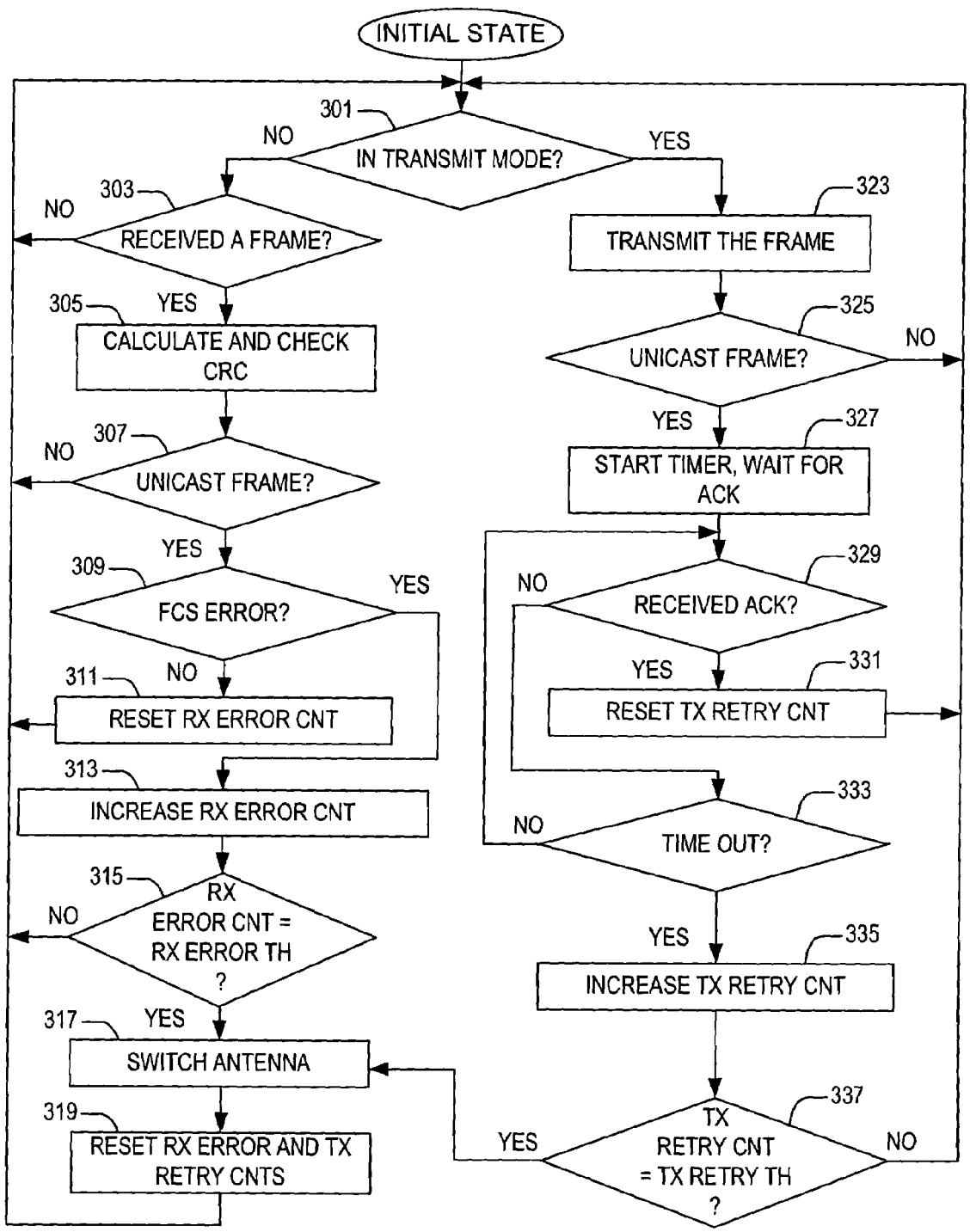
FIG. 3 is a flowchart diagram illustrating operation of the antenna select logic of FIG. 2 according to an exemplary embodiment of the present invention.

FIG. 3 is a flowchart diagram illustrating operation of the antenna select logic 207 according to an exemplary embodiment of the present invention. From an initial state, operation proceeds to a query block 301 in which it is determined whether the MAC device 201 is in receive or transmit mode. If in receive mode, operation proceeds to block 303 to determine whether a frame (e.g. an MPDU) has been received. If not, operation loops back to block 301 until a frame is received. When a frame is received, operation proceeds to block 305 in which the CRC is calculated and checked to determine whether a CRC error has occurred. As previously described, the CRC check logic 213 performs the CRC check and sets the CRC ERR FLG 215 if a CRC error has occurred. At next block 307, it is queried whether the frame is unicast. In this embodiment, receive errors are only those packets received with a unicast address as the destination address are processed for purposes of antenna diversity, and broadcast or multicast packets are ignored. If the packet is not unicast, operation loops back to block 301 and operation is repeated until a unicast packet is received.

If the frame is unicast as determined at block 307, then operation proceeds to block 309 to determine whether a CRC error occurred. As previously described, the antenna select logic 207 reads the CRC ERR FLG 215 to make this determination. If a CRC error has not occurred, then operation proceeds to block 311 in which the antenna select logic 207 resets the RX ERROR CNT 219 and operation loops back to block 301. In this embodiment, consecutive receive errors are counted and the receive error count is reset whenever a packet is successfully received. If, however, a CRC error has occurred as determined at block 309, operation instead proceeds to block 313 in which the RX ERROR CNT 219 is increased (e.g., incremented). Operation then proceeds to block 315 in which the RX ERROR CNT 219 is compared with the RX ERROR TH 221 to determine a receive threshold condition, e.g., whether the RX ERROR CNT 219 is equal to the RX ERROR TH 221. If not, the operation loops back to block 301. If and when the RX ERROR CNT 219 becomes equal to the RX ERROR TH 221, operation proceeds instead to block 317 in which the antenna is switched. As previously described, the antenna select logic 207 modifies the ANT SEL VAL 209 to switch the antenna. Operation then proceeds to block 319 in which both the RX ERROR CNT 219 and the TX RETRY CNT 223 are reset. In this embodiment, both transmit and receive error counts are reset after then antenna is switched.

Referring back to block 301, if in transmit mode, operation proceeds instead to block 323 in which the MAC processor 203 transmits a frame. Operation then proceeds to block 325 in which it is queried whether the frame is unicast. If not, operation loops back to block 301. If the frame is unicast, operation proceeds to block 327 in which the antenna select logic 207 starts the TX timer 217 and waits for an ACK packet. Operation proceeds to block 329 in which it is queried whether the ACK packet has been received. If not, operation proceeds to block 333 to determine whether a timeout has occurred. If not, operation loops back to block 329. If an ACK packet has been received as determined at block 329, operation proceeds to block 331 in which the TX RETRY CNT 223 is reset, and operation loops back to block 301. Thus, if an ACK packet is received within the predetermined time defined by the TX timer 217, then the TX RETRY CNT 223 is reset and operation returns to evaluate the next frame. If a timeout occurs before an ACK packet is received as determined at block 333, then operation proceeds to block 335 in which the TX RETRY CNT 223 is increased and then to block 337 in which the TX RETRY CNT 223 is compared to the TX RETRY TH 225 to determine the transmit threshold condition. If the TX RETRY CNT 223 is not equal to the TX RETRY TH 225, then operation loops back to block 301. Otherwise, operation proceeds to block 317 to switch the antenna and then to block 319 to reset the error counts.

The threshold values 221 and 225 may be fixed or programmable. If programmable, they may be pre-programmed at time of manufacture, and they may be further modified depending upon the configuration or anticipated mode of operation. The MAC device 201 uses one of the antennas 103 or 105 for both transmit and receive operations, and switches the antenna whenever either a threshold number of transmit or receive unicast packet errors occur. For the MAC device 201, the receive error count is reset if a packet is successfully received and the transmit error count is reset if a packet is successfully transmitted. Both error counts are reset after the antenna is switched.

Figure 4:
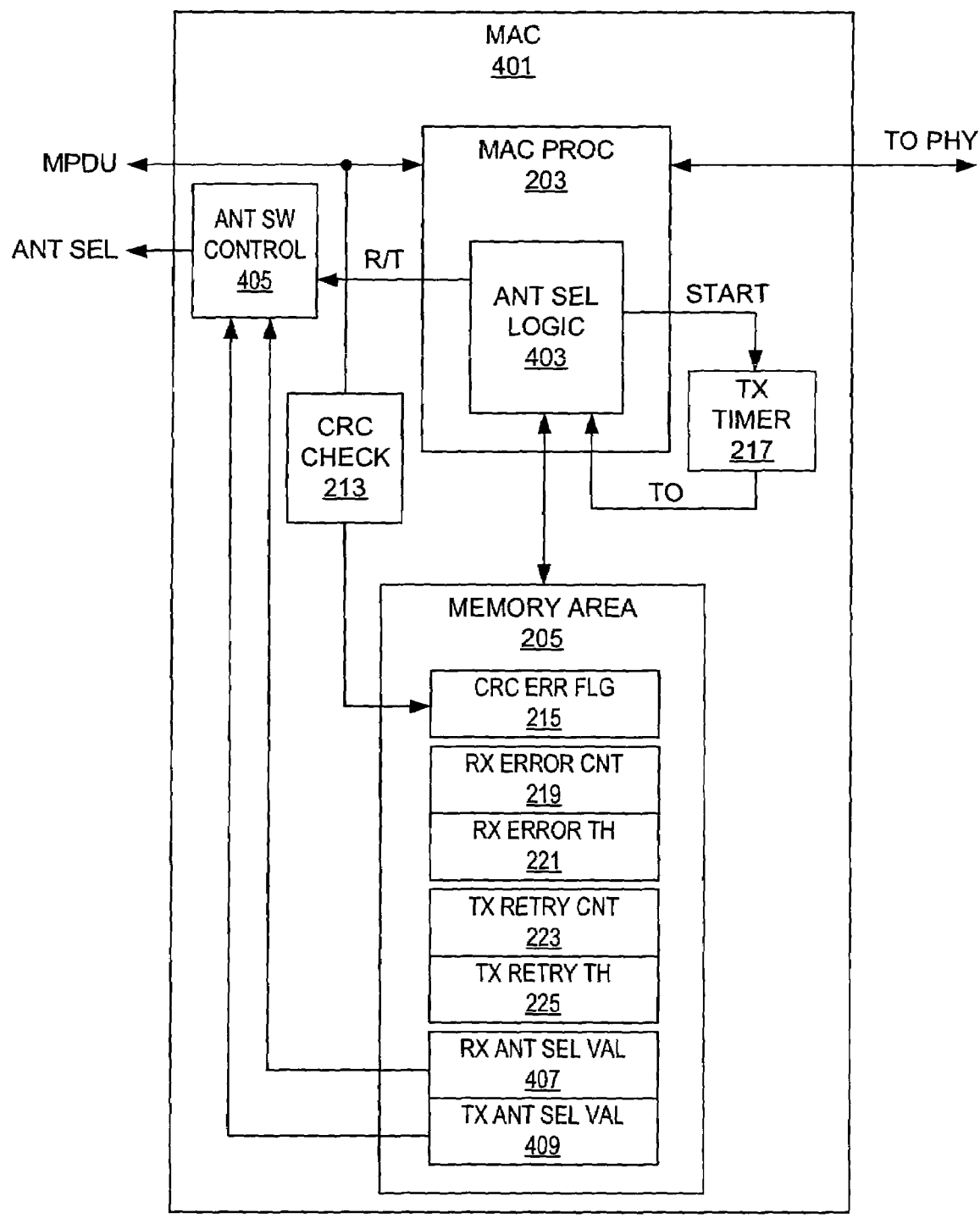
FIG. 4 is a more detailed block diagram of another embodiment of a MAC device implemented according to an exemplary embodiment of the present invention which may be used as the MAC device of FIG. 1.

FIG. 4 is a more detailed block diagram of another embodiment of a MAC device 401 implemented according to an exemplary embodiment of the present invention which may be used as the MAC device 115. The MAC device 401 is similar to the MAC device 201 in which similar components assume identical reference numbers. The antenna select logic 207 is replaced with modified antenna select logic 403, the antenna switch controller 211 is replaced with a modified antenna switch controller 405, and the ANT SEL VAL 209 in the memory area 205 is replaced with a receive antenna select value (RX ANT SEL VAL) 407 and a separate transmit antenna select value (TX ANT SEL VAL) 409. The operation of the MAC device 401 is similar to the MAC device 201 except that the antenna select logic 403 is configured to separately select a receive antenna and a transmit antenna as further described below. The RX ANT SEL VAL 407 identifies the antenna for use in receive mode and the TX ANT SEL VAL 409 identifies the antenna for use in transmit mode. The antenna switch controller 405 asserts the ANT SEL signal based on the RX ANT SEL VAL 407 when in receive mode and based on the TX ANT SEL VAL 409 when in transmit mode.

In one embodiment, the RX antenna switch controller 405 selects the appropriate antenna based on the mode of operation, e.g., TX or RX. There may be certain situations, however, in which it desired not to switch the antenna based solely on the RX/TX mode. For example, after transmitting a packet, the transceiver 101 switches to the receive mode in anticipation of receiving the ACK packet. It may be desired that the same antenna used to transmit the packet be used to receive the ACK packet, so that it is not desired to switch the antenna in this case. In the embodiment shown, the antenna select logic 403 asserts a separate signal R/T to the antenna switch controller for determining the mode of operation. The R/T signal generally follows the RX/TX mode with the exception that the antenna is not switched to the receive antenna for the ACK packet. In particular, the R/T signal is set to "R" for receive mode and to "T" for transmit mode and for receiving the ACK packet.

Figure 5:
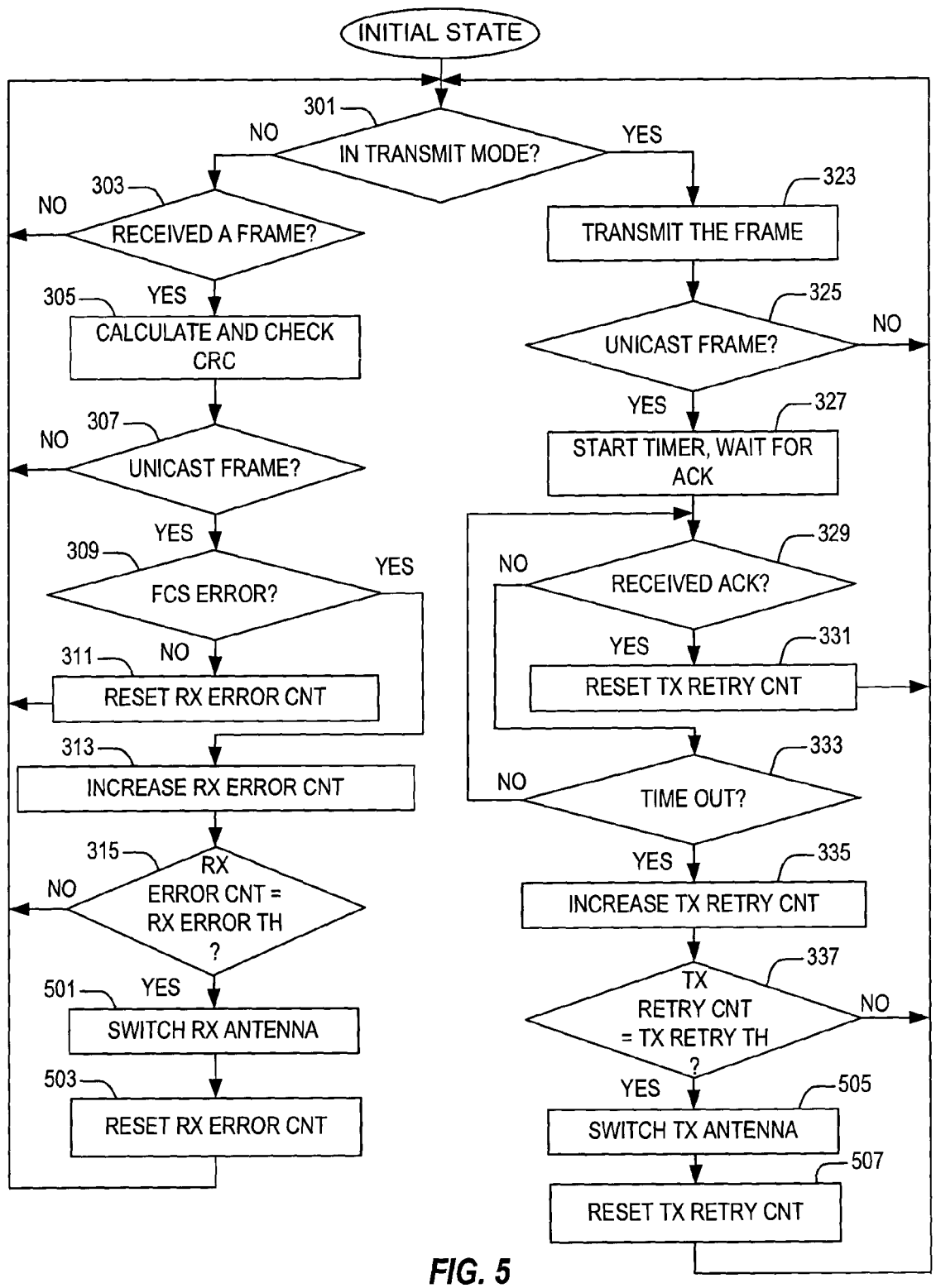
FIG. 5 is a flowchart diagram illustrating operation of the antenna select logic of FIG. 4 implemented according to an exemplary embodiment of the present invention.

FIG. 5 is a flowchart diagram illustrating operation of the antenna select logic 403 according to an exemplary embodiment of the present invention. The flowchart of FIG. 5 is similar to the flowchart of FIG. 3 in which similar blocks assume identical reference numbers. During receive mode, operation is substantially the same except that blocks 317 and 319 are replaced with blocks 501 and 503, respectively.

In this case, if the RX ERROR CNT 219 is equal to the RX ERROR TH 221 as determined at block 315, then operation proceeds to block 501 in which the receive antenna is switched. In this case, the antenna select logic 403 modifies the RX ANT SEL VAL 407 to switch the receive antenna. Operation then proceeds to block 503 in which the RX ERROR CNT 219 is reset, and then operation returns to block 301.

During transmit mode, operation is substantially the same except that blocks 505 and 507 are added. In this case, if the TX RETRY CNT 223 is equal to the TX RETRY TH 225 as determined at block 337, then operation proceeds to block 505 in which the transmit antenna is switched. In this case, the antenna select logic 403 modifies the TX ANT SEL VAL 409 to switch the transmit antenna. Operation then proceeds to block 507 in which the TX RETRY CNT 223 is reset, and then operation returns to block 301.

Figure 6:
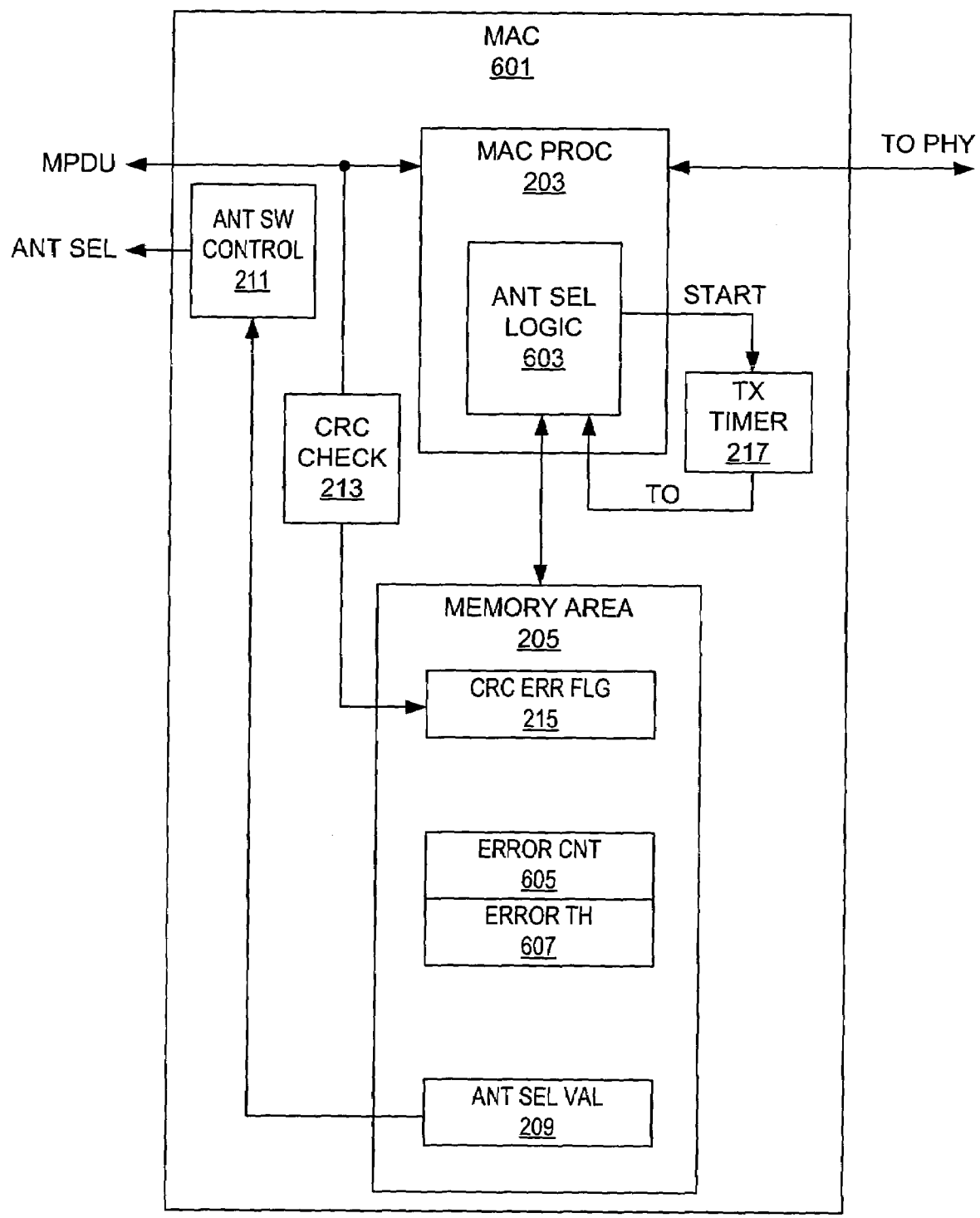
FIG. 6 is a more detailed block diagram of another embodiment of a MAC device implemented according to an exemplary embodiment of the present invention which may be used as the MAC device of FIG. 1.

FIG. 6 is a more detailed block diagram of another embodiment of a MAC device 601 implemented according to an exemplary embodiment of the present invention which may be used as the MAC device 115. The MAC device 601 is similar to the MAC device 201 in which similar components assume identical reference numbers. The antenna select logic 207 is replaced with modified antenna select logic 603, the RX ERROR CNT 219 and the TX RETRY CNT 223 in the memory area 205 are replaced with a single global error count (ERR CNT) 605 and the RX ERROR TH 221 and the TX RETRY TH 225 are both replaced with a single global error threshold (ERROR TH) 607. The operation of the MAC device 601 is similar to the MAC device 201 except that the receive and transmit errors are not separately tracked. Instead, any consecutive number of transmit and receive unicast packet errors equal to the global threshold causes the antenna select logic 603 to switch the antenna. The selected antenna is used for both transmit and receive operations.

Figure 7:
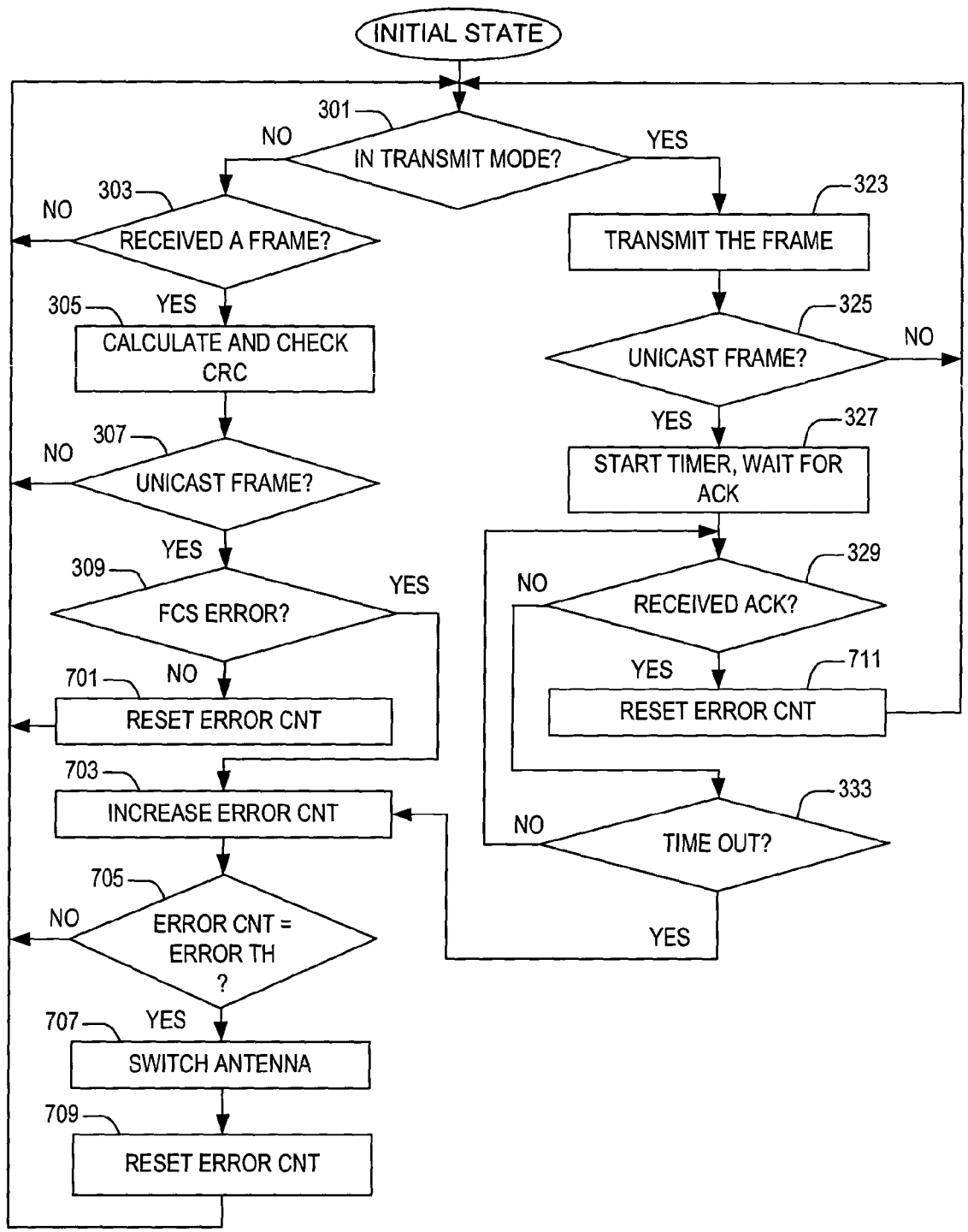
FIG. 7 is a flowchart diagram illustrating operation of the antenna select logic of FIG. 6 according to an exemplary embodiment of the present invention.

FIG. 7 is a flowchart diagram illustrating operation of the antenna select logic 603 according to an exemplary embodiment of the present invention. The flowchart of FIG. 7 is similar to the flowchart of FIG. 3 in which similar blocks assume identical reference numbers. During receive mode, operation is substantially the same up to block 309 in which it is queried whether there is a CRC error. If not, operation proceeds to block 701 in which the global ERROR CNT 605 is reset, and then operation loops back to block 301. If a CRC error occurred, operation proceeds to block 703 in which the ERROR CNT 605 is increased and then to block 705 in which the ERROR CNT 605 is compared to the global ERROR TH 607 to determine a packet error communication threshold. If the ERROR CNT 605 is not yet equal to the ERROR TH 607, then operation loops back to block 301. Otherwise, operation proceeds to block 707 in which the antenna is switched, then to block 709 in which the ERROR CNT 605 is reset, and then operation loops back to block 301. In the transmit mode, block 331 is replaced with block 711 in which the ERROR CNT 605 is reset instead. If a timeout occurs as determined at block 333, operation loops instead to block 703 to increase the ERROR CNT 605 for comparison with the global threshold as previously described.

Figure 8:
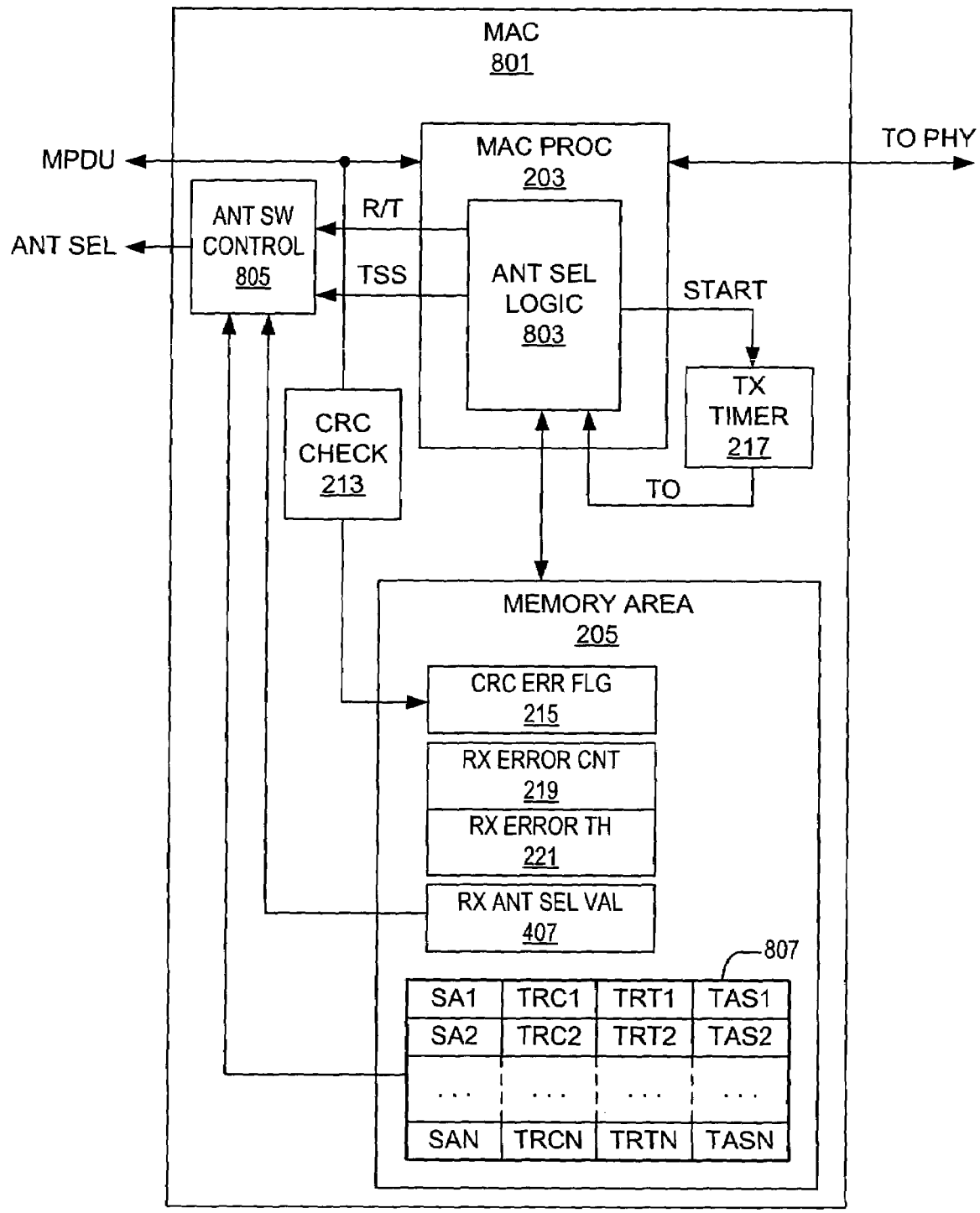
FIG. 8 is a more detailed block diagram of another embodiment of a MAC device implemented according to an exemplary embodiment of the present invention which may be used as the MAC device of FIG. 1.

FIG. 8 is a more detailed block diagram of another embodiment of a MAC device 801 implemented according to an exemplary embodiment of the present invention which may be used as the MAC device 115. The MAC device 801 is similar to the MAC device 401 in which similar components assume identical reference numbers. The antenna select logic 403 is replaced with modified antenna select logic 803, and the antenna switch controller 405 is replaced with a modified antenna switch controller 805. Also, in the memory area 205, the TX RETRY CNT 223, the TX RETRY TH 225 and the TX ANT SEL VAL 409 are all replaced with a table of values 807 further described below.

The operation of the MAC device 801 is similar to the MAC device 401 except that the antenna select logic 803 is configured to separately select a transmit antenna for each of multiple stations in the WLAN. The RX ANT SEL VAL 407 identifies the antenna for use in receive mode and the table 807 is used to identify the antenna for use in transmit mode based on the station to which a unicast packet is addressed. The antenna select logic 803 asserts the R/T signal as previously described and also asserts a transmit station select value TSS to the antenna switch controller 805. The antenna switch controller 805 asserts the ANT SEL signal based on the RX ANT SEL VAL 407 when in receive mode and a selected transmit antenna select (TAS) value from the table 807 based on the selected station identified by the TSS value when in transmit mode. The configuration of the MAC device 801 enables improved operation in the ad hoc mode when communicating with multiple devices in the WLAN.

The table 807 lists several values for each of one or more station addresses SA1, SA2, . . . , SAN, numbered from 1 to N for "N" different remote station addresses (e.g., MAC addresses). The station addresses are learned during normal operation and then stored in the table 807. Each station address value is associated with a corresponding transmit retry count (TRC), a transmit retry threshold (TRT), and a transmit antenna select (TAS). For example, station SA1 corresponds with TRC1, TRT1 and TAS1, station SA2 corresponds with TRC2, TRT2 and TAS2, and so on. Each station corresponds with a different TRT, although a single global TRT value may be used instead to reduce memory size. A default antenna may initially be chosen for each learned device, where the antenna is switched in the event of packet errors as further described below. The antenna select logic 803 asserts the TSS value identifying a remote station (SA1-SAN) when the transceiver 101 transmits a packet to the identified station, and the antenna switch controller 805 uses the TSS value to select a corresponding one of the TAS1-TASN values. For example, if the TSS value identifies station SA3, then the antenna switch controller 805 switches the antenna based on the TAS3 value retrieved from the table 807.

Figure 9:
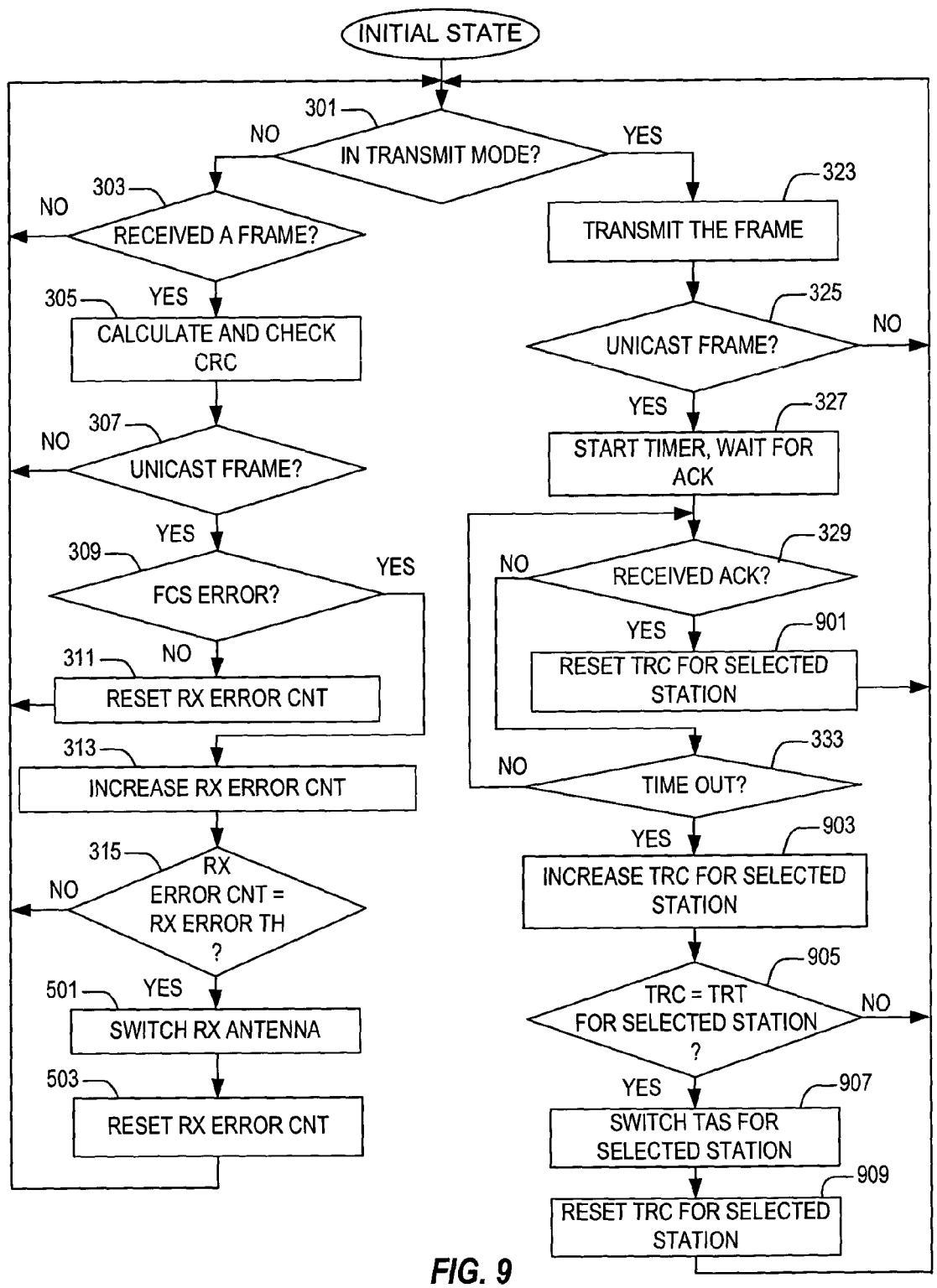
FIG. 9 is a flowchart diagram illustrating operation of the antenna select logic of FIG. 8 according to an exemplary embodiment of the present invention.

FIG. 9 is a flowchart diagram illustrating operation of the antenna select logic 803 according to an exemplary embodiment of the present invention. The flowchart of FIG. 9 is similar to the flowchart of FIG. 5 in which similar blocks assume identical reference numbers. During receive mode, operation is substantially the same for that of the antenna select logic 403 and is not further described. The transmit mode is similar except specific to the particular station address to which a unicast frame is transmitted. Operation is the same up to block 329 at which it is queried whether the ACK packet is received. If so, then operation proceeds instead to block 901 in which the particular TRC for the selected station is reset. Since the frame was a unicast frame as determined at block 325, then the station address is known.

Blocks 335, 337, 505 and 507 are replaced with similar blocks 903, 905, 907 and 909, respectively. In the event of timeout at block 333, operation proceeds to block 903 in which the TRC for the selected station is increased, and then to block 905 in which the TRC and TRT values of the selected station are compared. If the threshold condition has not been met, operation loops back to block 301. If the threshold condition is met, operation proceeds instead to block 907 in which the antenna is switched for the selected station. In particular, the corresponding TAS value in the table 807 is updated by the antenna select logic 803. Operation then proceeds to block 909 in which the TRC for the selected station is reset, and then operation loops back to block 301.

Although not specifically shown, it is noted that the table 807 may be expanded for storing receive diversity information. It is appreciated, however, that a receive antenna must be selected prior to receiving a packet, and that the identity or station address is only known after the packet header information is received and the source address resolved. It is contemplated that a selected antenna be used to receive the header and that the antenna be switched, if necessary, during packet reception to receive the packet payload with the desired antenna after the source address of the remote station transmitting the packet is identified. Even if the receive diversity information is not used to select a receive antenna for a particular remote station, it is still useful for identifying the appropriate antenna to be used for transmitting to that station. For example, if the transceiver 101 receives a significant number of packets from a remote station before actually transmitting to that station, the receive diversity information gathered for that remote station is used to select an antenna for transmitting to that station.

Although the present invention has been described in considerable detail with reference to certain preferred versions thereof, other versions and variations are possible and contemplated. Those skilled in the art should appreciate that they can readily use the disclosed conception and specific embodiments as a basis for designing or modifying other structures for providing out the same purposes of the present invention without departing from the spirit and scope of the invention as defined by the appended claims.

What is claimed is:

1. A wireless transceiver, comprising:
    a plurality of antennas;
    an antenna switch coupled to said plurality of antennas; and
    a media access controller, coupled to control said antenna switch, that determines when to switch to another antenna based on packet error rate, wherein said media access controller comprises: CRC check logic that determines an error in a received packet; a timer that determines a predetermined amount of time after a packet is transmitted; a memory that stores at least one packet error count; and antenna select logic, coupled to said CRC check logic, said timer and said memory, that counts received packet errors using said CRC check logic, that counts transmit packet errors using said timer, and that controls switching to another antenna.

2. The wireless transceiver of claim 1, further comprising: said memory storing at least one antenna select value; an antenna switch controller, coupled to said memory and to control said antenna switch, that selects an antenna based on said at least one antenna select value; and said antenna select logic modifying said at least one antenna select value to control antenna switching.

3. An antenna diversity system for a wireless transceiver having a plurality of antennas, comprising:
    an antenna switch for selecting from among the plurality of antennas;
    at least one counter that stores a packet error count;
    at least one packet error detector that detects a packet communication error; and
    antenna select logic, coupled to control said antenna switch, said at least one counter and said at least one packet error detector, that increments said packet error count when a packet communication error is detected, that compares the packet error count with a threshold value to determine whether a threshold condition is met, and that switches the antenna when said threshold condition is met.

4. The antenna diversity system of claim 3, wherein: said at least one counter comprises a receive error counter that stores a receive error count; and wherein said at least one packet error detector comprises cyclical redundancy code (CRC) check logic.

5. The antenna diversity system of claim 4, wherein said antenna select logic resets said receive error count if a unicast packet is received without a CRC error.

6. The antenna diversity system of claim 3, wherein: said at least one counter comprises a transmit retry counter that stores a transmit retry count; and wherein said at least one packet error detector comprises a timer that determines whether an acknowledge packet is received within a predetermined amount of time.

7. The antenna diversity system of claim 6, wherein said antenna select logic resets said transmit retry count if an acknowledge packet is received within said predetermined amount of time.

8. The antenna diversity system of claim 3, wherein: said at least one packet error detector comprises cyclical redundancy code (CRC) check logic and a timer that determines whether an acknowledge packet is received within a predetermined amount of time; and wherein said antenna select logic increments said packet error count when a unicast packet is received with a CRC error or if an acknowledge packet is not received within said predetermined amount of time after transmitting a unicast packet.

9. The antenna diversity system of claim 3, further comprising:
    a memory for storing a receive antenna select value and a transmit antenna select value;
    an antenna switch controller coupled to control said antenna switch and said memory;
    said at least one counter comprising a receive error counter that stores a receive error count and a transmit retry counter that stores a transmit retry count;
    said at least one packet error detector comprising cyclical redundancy code (CRC) check logic and a timer that determines whether an acknowledge packet is received within a predetermined amount of time; wherein said antenna select logic increments said receive error count when a unicast packet is received with a CRC error and increments said transmit retry count if an acknowledge packet is not received within said predetermined amount of time after transmitting a unicast packet; and
    wherein said antenna select logic modifies said receive antenna select value if said receive error count meets a first threshold and modifies said transmit antenna select value if said transmit retry count meets a second threshold.

10. The antenna diversity system of claim 9, wherein said antenna select logic resets said receive error count if a unicast packet is received without a CRC error and resets said transmit retry count if an acknowledge packet is received within said predetermined amount of time.

11. A method of selecting from among a plurality of antennas of a transceiver, comprising:
  counting packet errors;
  comparing a packet error count with a threshold value to determine a threshold condition;
  switching to a different antenna if the threshold condition is met; and
  resetting the packet error count when the threshold condition is met.

12. The method of claim 11, wherein said counting packet errors comprises:
  determining whether a received unicast packet has an error; and
  incrementing the packet error count if the received unicast packet has an error.

13. The method of claim 12, further comprising resetting the packet error count if a unicast packet is received without an error.

14. The method of claim 12, wherein said determining comprises determining whether the received unicast packet has a cyclic redundancy code (CRC) error.

15. The method of claim 12, wherein said counting packet errors comprises:
  determining whether a transmitted unicast packet is acknowledged within a predetermined amount of time; and
  incrementing the packet error count if the transmitted unicast packet is not acknowledged in time.

16. The method of claim 15, further comprising resetting the packet error count if a transmitted unicast packet is acknowledged within the predetermined amount of time.

17. The method of claim 11, wherein said counting packet errors comprises:
  incrementing the packet error count if a received unicast packet has an error; and
  incrementing the packet error count if a transmitted unicast packet is not acknowledged in time.

18. The method of claim 17, further comprising resetting the packet error count if a unicast packet is received without an error or if a transmitted unicast packet is acknowledged within the predetermined amount of time.

19. The method of claim 11, further comprising:
  using a first selected antenna for transmitting packets;
  using a second selected antenna for receiving packets;
  said counting packet errors comprising:
  incrementing a received packet error count if a unicast packet is received with an error; and incrementing a retry error count if a transmitted unicast packet is not acknowledged within a predetermined amount of time;
  said comparing comprising: comparing the received packet error count with a first threshold value to determine a first threshold condition; and comparing the retry error count with a second threshold value to determine a second threshold condition;
  said switching comprising: switching the first selected antenna to different antenna for receiving packets if the first threshold condition is met; and switching the second selected antenna to different antenna for transmitting packets if the second threshold condition is met; and
  said resetting comprising: resetting the received packet error count if the first threshold condition is met; and resetting the retry error count if the second threshold condition is met.

20. The method of claim 19, further comprising using the first selected antenna for detecting acknowledgment of a transmitted packet.

21. The method of claim 19, further comprising:
  resetting the received packet error count if a unicast packet is received without an error; and
  resetting the retry error count if a transmitted unicast packet is acknowledged within the predetermined amount of time.

22. The method of claim 11, further comprising:
  selecting a corresponding antenna for each of one or more remote stations for transmitting unicast packets;
  counting unicast transmit retry errors for each of the one or more remote stations;
  switching the selected antenna for transmitting unicast packets to a remote station if a corresponding retry error count meets a threshold condition; and
  resetting the retry error count of a corresponding remote station if the threshold condition is met for that remote station.

* * * * *